United States Patent

Feerick

[11] Patent Number: 5,927,864
[45] Date of Patent: *Jul. 27, 1999

[54] BEARING ASSEMBLY WITH SELF-CONTAINED AUXILIARY SEAL

[75] Inventor: Kevin Feerick, Wheaton, Ill.

[73] Assignee: Emerson Power Transmission Corp., Aurora, Ill.

[ * ] Notice: This patent issued on a continued prosecution application filed under 37 CFR 1.53(d), and is subject to the twenty year patent term provisions of 35 U.S.C. 154(a)(2).

[21] Appl. No.: 08/712,976

[22] Filed: Sep. 12, 1996

[51] Int. Cl.⁶ .................................................. F16C 33/76
[52] U.S. Cl. ........................................ 384/482; 384/486
[58] Field of Search .................................. 384/477, 481, 384/482, 484, 485, 486

[56] References Cited

U.S. PATENT DOCUMENTS

| | | | |
|---|---|---|---|
| 2,812,224 | 11/1957 | Richmond | 384/477 |
| 2,830,858 | 4/1958 | Moorman et al. | 384/484 |
| 2,873,153 | 2/1959 | Haynie | 384/484 |
| 3,014,768 | 12/1961 | Dickinson | 384/484 |
| 3,856,368 | 12/1974 | Andersen | 384/485 |
| 3,869,181 | 3/1975 | Barber | 384/482 |
| 4,015,833 | 4/1977 | Taylor | 384/484 |
| 4,544,286 | 10/1985 | Basener | 384/486 |
| 4,699,526 | 10/1987 | Sato | 384/486 |
| 4,749,287 | 6/1988 | Anguera | 384/484 |
| 4,799,808 | 1/1989 | Otto | 384/481 |
| 4,991,982 | 2/1991 | Colanzi et al. | 384/484 |
| 5,042,822 | 8/1991 | Dreschmann | 384/485 |
| 5,163,691 | 11/1992 | Lederman | 384/486 |
| 5,292,199 | 3/1994 | Hosbach et al. | 384/486 |
| 5,509,667 | 4/1996 | Klein et al. | 384/486 |

FOREIGN PATENT DOCUMENTS

| | | | |
|---|---|---|---|
| 0875447 | 7/1971 | Canada | 384/486 |
| 0388258 | 9/1990 | European Pat. Off. | 384/482 |

*Primary Examiner*—John A. Jeffery
*Assistant Examiner*—Matthew A. Kaness
*Attorney, Agent, or Firm*—Leydig, Voit & Mayer, Ltd.

[57] ABSTRACT

A roller bearing assembly having primary seals interposed between inner and outer races on opposite axial sides of the roller elements of the bearing assembly and at least one auxiliary seal on a axial side of said bearing assembly outwardly of a primary seal. The auxiliary seal includes a flexible annular sealing member mounted in fixed relation to the outer race for sealing contact with an outer perimeter of the inner race for providing an auxiliary barrier to the ingress of contaminants inwardly toward the roller elements.

25 Claims, 2 Drawing Sheets

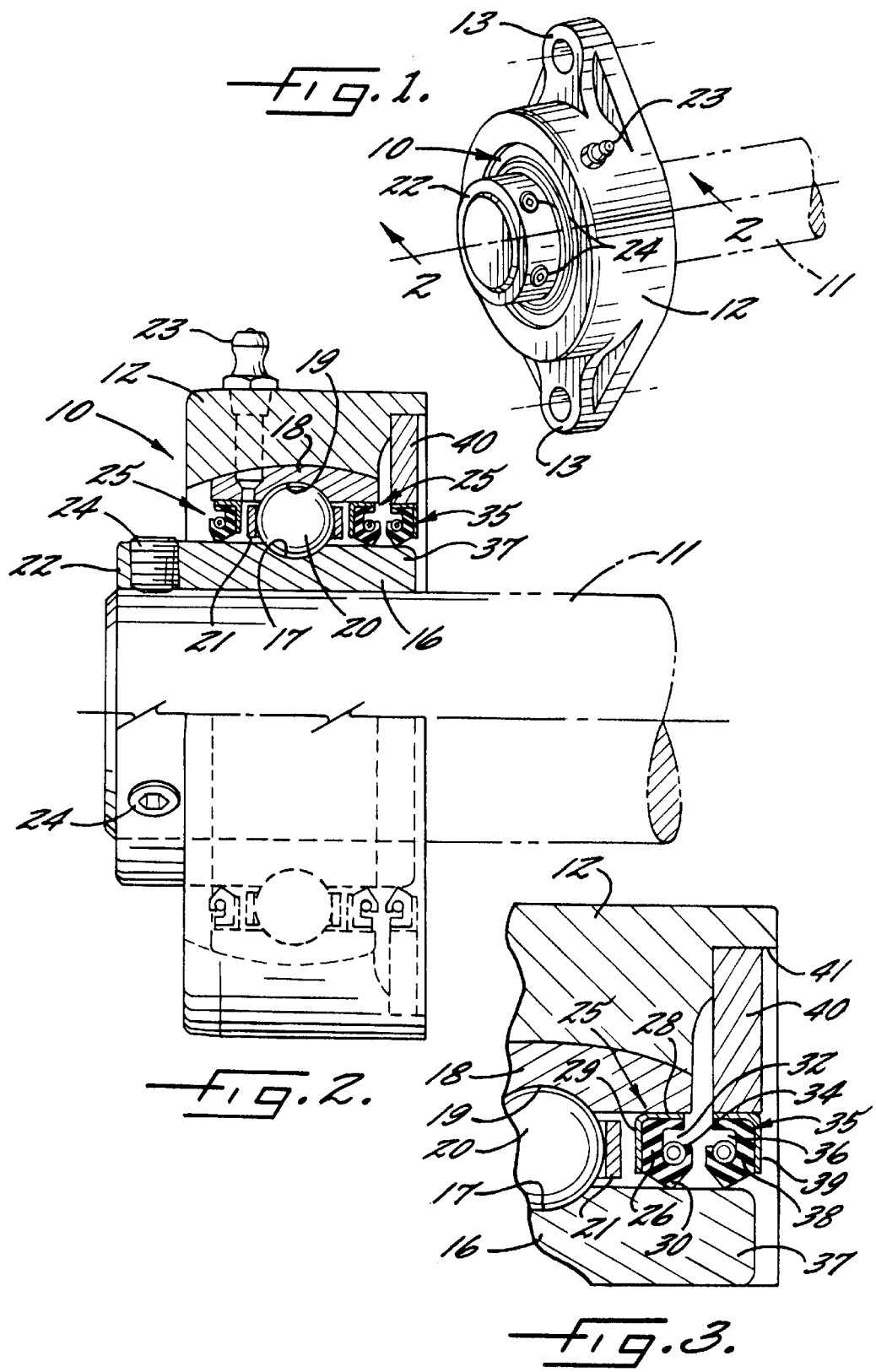

BEARING ASSEMBLY WITH SELF-CONTAINED AUXILIARY SEAL

FIELD OF THE INVENTION

The present invention relates generally to bearing assemblies, and more particularly, to sealed bearing assemblies for use in contaminated working environments.

BACKGROUND OF THE INVENTION

Bearing assemblies used in many applications are subject to liquid, gaseous and solid contaminants in the outside environment. Contaminants which migrate to the internal relative moving elements of the bearing assembly can impede reliable operation and cause excessive wear and premature bearing failure. Proposals for providing improved or additional seals about the bearing assembly often have been complex, expensive, or require installation of auxiliary seals following installation of the bearing assembly. For example, proposals have been made for mounting auxiliary sealing elements on the bearing assembly housing which are designed to sealingly engage the rotary shaft supported by the bearing assembly axially outwardly of primary seals of the bearing assembly. Such auxiliary seals become ineffective, however, when used on shafts with keyways since contaminants can migrate through the keyways. Furthermore, such auxiliary seals can be subject to excessive wear and damage from keyways, burrs and sharp edges on the shaft.

OBJECTS AND SUMMARY OF THE INVENTION

It is an object of the present invention to provide a bearing assembly with an improved, relatively simple, auxiliary sealing arrangement that enables the bearing assembly to be used in severe contaminated working environments.

Another object is to provide a bearing assembly as characterized above in which the auxiliary seals are unaffected by keyways in the shaft upon which the bearing assembly is mounted.

A further object is to provide a bearing assembly of the foregoing type in which the auxiliary seals are not susceptible to wear or damage from shaft keyways, burrs or sharp edges.

Still another object is to provide a bearing assembly as characterized above which has a unitized construction that facilitates installation of the bearing assembly on a shaft.

Other objects and advantage of the invention will become apparent upon reading the following detailed description and upon reference to the drawings, in which:

BRIEF DESCRIPTION OF THE DRAWINGS

FIG. 1 is a perspective of an illustrative bearing assembly embodying the present invention;

FIG. 2 is an enlarged side elevational view, in partial section, of the illustrated bearing assembly taken in the plane of line 2—2 in FIG. 1;

FIG. 3 is an enlarged fragmentary section of the primary and secondary seals of the illustrated bearing assembly;

Figure 4:
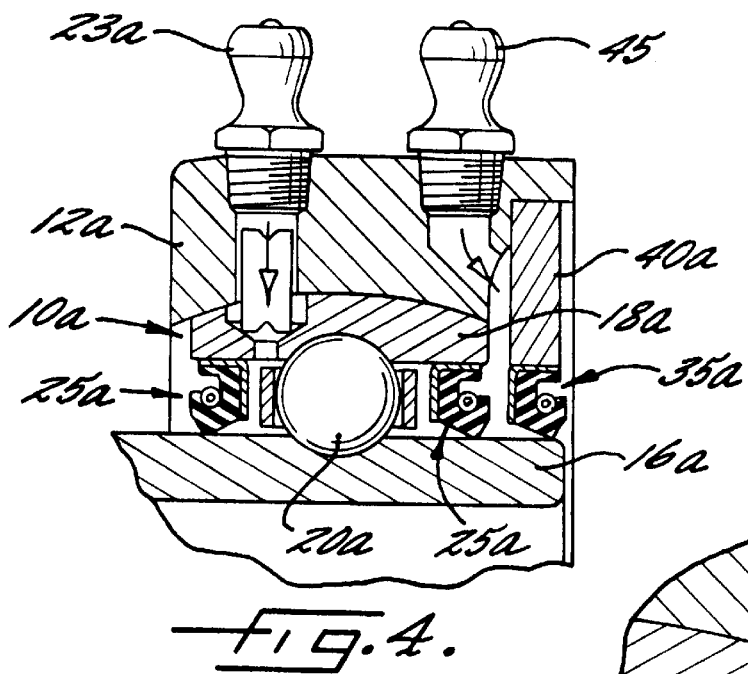
FIG. 4 is a fragmentary section of an alternative embodiment of bearing assembly according to the present invention.

While the invention is susceptible of various modifications and alternative constructions, certain illustrated embodiments thereof have been shown in the drawings and will be described below in detail. It should be understood, however, that there is no intention to limit the invention to the specific forms disclosed, but on the contrary, the intention is to cover all modifications, alternative construction and equivalents falling within the spirit and scope of the invention. Moreover, while bearing assemblies of the present invention have particular applicability for use in conveyors used in the food and beverage industry wherein they are subject to various contaminants in the outside environment, the bearing assemblies may be used for other applications.

DETAILED DESCRIPTION OF THE PREFERRED EMBODIMENTS

Referring now more particularly to the drawings, there is shown an illustrative bearing assembly 10 supporting the end of a rotary shaft 11 and retained within a conventional housing or pillow block 12. The housing 12 in this case has apertured mounting flanges 13 at opposite ends for enabling the housing 12 to be bolted or otherwise mounted onto a suitable wall or mounting panel. It will be understood that a conventional end cap may be secured to the end of the housing 12 for enclosing and protecting the outer end of the shaft and the adjacent side of the bearing assembly from the outside environment.

The bearing assembly 10 includes an annular inner race 16 having a grooved raceway 17 which preferably is wear hardened for extended bearing life. Surrounding the annular inner race 16 in spaced relation thereto is an annular outer race 18 having a grooved raceway 19 disposed in opposed relationship to the inner raceway 16, the raceways 17, 19 serving to receive in nesting relationship a plurality of spaced balls or rolling elements 20. The rolling elements 20 in this case are disposed in rolling element pockets of a conventional cage 21. For securing the bearing assembly 10 on the shaft 11, the inner race 16 has an axial extension 22 formed with one or more threaded apertures through which respective set screws 24 may be advanced into secure engaging relation with the shaft 11. A grease fitting 23 is supported by the housing 12 for directing grease through the outer race 18 to lubricate the roller elements 20. The outer bearing race 18 in this case has a convex configured outer surface disposed within a concave recess of the housing 12 which, as will be understod by one skilled in the art, permit limited rocking movement of the outer bearing race and a shaft supported within the bearing assembly relative to the housing to facilitate proper shaft alignment.

For sealing opposed ends of the bearing assembly 10, primary seals 25 are interposed between the inner and outer races 16, 18 on opposite axial sides of the roller elements 20. The primary seals 25 in this case are spring lip seals of a conventional type, each comprising an annular seal body 26 molded of rubber or other resilient material, such as Nitrile, within an outer annular retainer 28. The annular retainer 28 may be formed from a metal stamping and is fixed within the outer race 18 with a press fit. The retainer 28 has a generally L-shaped configuration with an inwardly directed radial leg 29 located in close axial spaced relation to the cage 21. The lip seal body 26 is formed with a V-shaped lip 30 for sealingly engaging the outer perimeter of the inner race 16 and a channel 32 which faces axially outwardly of the bearing assembly. A garter spring 34 is positioned within the channel 32 in a known manner to provide an inwardly directed radial load on the seal to enhance its sealing effectiveness. It will be understood that other primary seals of a conventional type could alternatively be used.

In accordance with the invention, the bearing assembly includes at least one self contained auxiliary seal for sealing contact with an outer perimeter of the inner race outboard of a primary seal for defining a sealed chamber therebetween and for further protecting the bearing assembly against the entry of contamination in severely contaminated working environments. The illustrated bearing assembly 10 includes an auxiliary seal 35 mounted within the housing 12 for sealing contact with an outer cylindrical surface of an axial extension 37 of the inner race 16. The auxiliary seal 35 in this case is disposed on an inboard side of the bearing assembly, or in other words, opposite the side of the bearing assembly adjacent the terminal end of the shaft 11. The illustrated auxiliary seal 35 is a spring lip seal substantially identical to the primary seals 25, but with a spring receiving groove 36 of the lip seal body 38 facing in axially opposed relation to the adjacent primary seal 25.

For supporting the auxiliary seal 35, an annular retainer 39 thereof is press fit within a metal shield 40 in the form of an annular ring, which in turn is press fit within a counterbore 41 formed in an inboard end of the housing 12. It will be appreciated that since the auxiliary seal 35 is mounted within the housing 12 for sealing contact with the inner bearing race 16, the bearing assembly 10 may be manufactured as a unitized assembly for subsequent field installation. Moreover, since the auxiliary seal engages an axial extension of the inner bearing race, its operation and life are unaffected by keyways or other surface imperfections of the shaft 11. Hence, the primary-secondary seal arrangement is highly effective in preventing the migration of liquid, solid, and gaseous contaminants into the internal relatively moveable elements of the bearing assembly.

Again, while the illustrated auxiliary seal 35 is a spring lip seal, other conventional types of auxiliary seals could alternatively be used. It will be appreciated that the use of identical auxiliary and primary spring lip seals in the illustrated embodiment contributes to the simplicity of the assembly and its economical manufacture. While an auxiliary seal has been shown on the inboard side of the bearing assembly, it will be understood that a similar auxiliary seal could be provided on the outboard side of the bearing assembly in lieu of an end cap.

Referring to FIG. 4, an alternative embodiment of the invention is shown wherein items similar to those described above have been given similar reference numerals with a distinguishing "a" added. In this embodiment, the bearing assembly 10a includes a second lubricating fitting 45 communicating through the housing 12 into a lubricant receiving chamber defined between the auxiliary and secondary seals 35, 25, which further impedes and prevents inward migration of contaminants from the outside environment.

Figure 5:
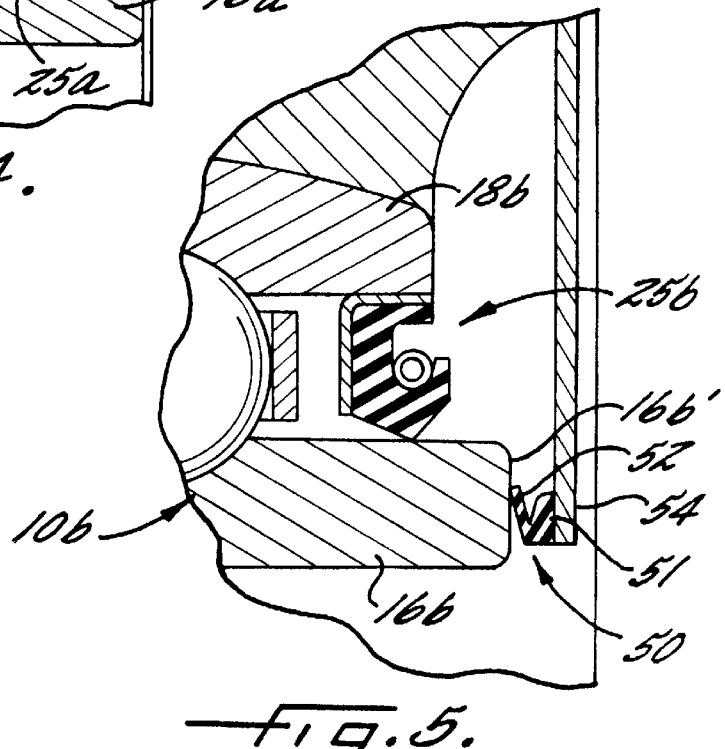
FIG. 5 is a fragmentary section of a bearing assembly according to the present invention with an alternative form of auxiliary seal.

Referring to FIG. 5, there is shown a bearing assembly having an alternative form of auxiliary seal, wherein items similar to those described above have been given similar reference numerals with the distinguishing suffix "b" added. The bearing assembly 10b includes inner and outer races 16b, 18b, and primary seals 25b, identical to those described above. The auxiliary seal 35b in this case is in the form of an end face seal adapted for sealing contact with an axial end of the inner bearing race 16b. An annular metal shield or mounting plate 40b is press fit or otherwise affixed to the outer bearing race 18b with the auxiliary seal 35b mounted adjacent an annular opening therein. The auxiliary seal 35b in this instance is in the form of a lip seal having a "V" configuration defined by a body portion 51 molded or otherwise fixed to an inner axial side of the mounting plate 40b and a lip 52 extending outwardly and axially inwardly for flexible sealing contact with the end face 16b' of the inner race. Again, the auxiliary seal 35b is a self-contained part of the bearing assembly 10b and together with the adjacent primary seal 25b define a sealed chamber for further impeding the ingress of contaminants to the roller elements 20b.

From the foregoing, it can be seen that the bearing assembly of the present invention is particularly adapted for use in contaminated working environments. The auxiliary seal defines a further protective barrier to contaminants and is adapted for long term reliable use unaffected by wear or damage from keyways, burrs or sharp edges of a rotary shaft upon which the bearing assembly is mounted. The bearing assembly also has a unitized construction that facilitates field installation on a shaft.

What is claimed is:

1. A bearing assembly comprising an inner race for mounting on a shaft, an outer race disposed concentrically about said inner race, a plurality of roller elements interposed between said inner and outer races, a stationary bearing housing surrounding and supporting said outer race while permitting limited relative pivotal rocking movement of said outer race and a shaft mounted therein with respect to said housing, primary seals between said inner and outer races on opposite axial sides of said roller elements, an auxiliary seal on at least one axial side of said bearing assembly axially outwardly of the primary seal on said one side, said auxiliary seal being fixedly secured to said bearing housing in disassociated relation to the outer race and having a flexible annular sealing member for engagement with an outer periphery of said inner race axially outwardly of the primary seal and outwardly of said outer bearing race on said one side for providing a further barrier to ingress of contaminants inwardly towards the roller elements.

2. The bearing assembly of claim 1 in which said primary seals and said auxiliary seal are spring lip seals each comprising a retainer mounted in fixed relation to said housing, a flexible annular lip seal body fixed to a retainer, and a spring for urging the lip seal body into sealing contact with the inner bearing race.

3. The bearing assembly of claim 1 in which said primary seals are in sealing contact with an outer cylindrical surface of said inner race, and said auxiliary seal is in sealing contact with an axial end face of said inner race.

4. The bearing assembly of claim 3 in which said auxiliary seal is a lip seal having a body portion mounted in fixed relation to said outer race and a flexible lip in sealing contact with the annular end face of said inner race.

5. The bearing assembly of claim 4 in which said lip seal is substantially "V" shaped.

6. The bearing assembly of claim 1 in which said primary seals and said auxiliary seal each is a spring lip seal, said spring lip seals each comprising a retainer, a flexible annular lip seal body affixed to the retainer, and a spring for urging the lip seal body into sealing contact with the inner bearing race.

7. The bearing assembly of claim 6 in which said spring lip seals each are identical.

8. The bearing assembly of claim 7 in which said spring lip seals each have an axially opening chamber in which the respective spring is disposed.

9. The bearing assembly of claim 8 in which said lip seal bodies of said primary seals each are mounted with the axially opening chamber facing outwardly relative to the roller elements, and the spring lip seal of said auxiliary seal being mounted with the axially opening chamber facing the primary seal on said one side.

10. The bearing assembly of claim 6 in which said auxiliary spring lip seal is mounted within an annular shield, said annular shield being fixedly mounted on said housing.

11. The bearing assembly of claim 1 in which said auxiliary seal and the primary seal on said one side define a lubricant receiving chamber, and said bearing assembly includes a lubrication fitting for communicating lubricant to said chamber.

12. The bearing assembly of claim 11 including a first lubricating bearing communicating through said housing to an axial chamber between said primary seals, and a second lubricating fitting communicating with a chamber defined between said auxiliary seal and the primary seal on said one side.

13. The bearing assembly of claim 1 in which said housing is formed with a counterbore, and said auxiliary seal includes a shield in a form of an annular ring supported within said housing counterbore.

14. The bearing assembly of claim 1 in which said inner race has a portion extending axially longer than said outer race on said one side, and said auxiliary seal sealingly contacts an outer perimeter of said axially extending portion of the inner race.

15. The bearing assembly of claim 1 in which said auxiliary seal is mounted within a counterbore formed in an axial end of the housing.

16. The bearing assembly of claim 15 in which said auxiliary seal mounting member is press fit within said counterbore.

17. A bearing assembly comprising an inner race for mounting on a shaft, an outer race disposed concentrically about said inner race, a plurality of roller elements interposed between said inner and outer races for relative rotational movement between said inner and outer races, a stationary bearing housing surrounding and supporting said outer race while permitting limited relative pivoted rocking movement of said outer race and a shaft mounted therein with respect to said housing primary seals between said inner and outer races on opposite axial sides of said roller elements, an auxiliary seal fixedly secured to said housing on at least one axial side of said bearing assembly in disassociated relation to the outer race axially outwardly of the primary seal on said one side for sliding engagement with an outer periphery of said inner race axially outwardly of the primary seal on said one side for providing a further barrier to ingress of contaminants inwardly towards the roller elements, and said primary and secondary seals each being identical in construction.

18. The bearing assembly of claim 17 in which said primary seal and said auxiliary seal each are in sealing contact with an outer cylindrical surface of said inner race.

19. The bearing assembly of claim 17 in which said primary seals are in sealing contact with an outer cylindrical surface of said inner race, and said auxiliary seal is in sealing contact with an axial end face of said inner race.

20. The bearing assembly of claim 17 in which said housing is formed with a counterbore, and said auxiliary seal mounting member is supported within said housing.

21. The bearing assembly of claim 17 in which said inner race has a portion extending axially longer than said outer race on said one side, and said auxiliary seal sealingly contacts an outer perimeter of said axially extending portion of the inner race.

22. A bearing assembly comprising an inner race for mounting on a shaft, an outer race disposed concentrically about said inner race, a plurality of roller elements interposed between said inner and outer races, a stationary bearing housing surrounding and supporting said outer race, primary seals between said inner and outer races on opposite axial sides of said roller elements, an auxiliary seal on at least one axial side of said bearing assembly axially outwardly of the primary seal on said one side, said auxiliary seal being fixedly secured to said bearing housing in spaced relation to an axial end of said outer race in disassociated relation to the outer race and having a flexible annular sealing member for engagement with an outer periphery of said inner race axially outwardly of the primary seal and outwardly of said outer bearing race on said one side for providing a further barrier to ingress of contaminants inwardly towards the roller elements.

23. The bearing assembly of claim 22 in which said primary and secondary seals each are of identical construction.

24. A bearing assembly comprising an inner race for mounting on a shaft, an outer race disposed concentrically about said inner race, a plurality of roller elements interposed between said inner and outer races, a bearing housing surrounding and supporting said inner and outer races, primary seals between said inner and outer races on opposite axial sides of said roller elements, an auxiliary seal on at least one axial side of said bearing assembly axially outwardly of the primary seal on said one side in disassociated relation to the outer race, said auxiliary seal having a flexible annular sealing member for engagement with an outer periphery of said inner race axially outwardly of the primary seal and outwardly of said outer bearing race on said one side for providing a further barrier to ingress of contaminants inwardly towards the roller elements, said auxiliary seal and the primary seal on said one side defining a lubricant-receiving chamber, and a lubricant fitting mounted in said housing for communicating lubricant to said chamber.

25. The bearing assembly of claim 24 including a second lubricating fitting communicating through said housing to an axial chamber between said primary seals.

* * * * *